US009364397B2

(12) United States Patent
Shibasaki et al.

(10) Patent No.: US 9,364,397 B2
(45) Date of Patent: Jun. 14, 2016

(54) MEDICINAL AGENT FILLING DEVICE

(75) Inventors: Tetsuya Shibasaki, Hirakata (JP); Katsuyoshi Sakaguchi, Hirakata (JP)

(73) Assignee: TAKAZONO TECHNOLOGY INCORPORATED, Hirakata-shi, Osaka (JP)

( * ) Notice: Subject to any disclaimer, the term of this patent is extended or adjusted under 35 U.S.C. 154(b) by 0 days.

(21) Appl. No.: 14/397,768

(22) PCT Filed: Jun. 13, 2012

(86) PCT No.: PCT/JP2012/065103
§ 371 (c)(1), (2), (4) Date: Oct. 29, 2014

(87) PCT Pub. No.: WO2013/186868
PCT Pub. Date: Dec. 19, 2013

(65) Prior Publication Data

US 2015/0088303 A1 Mar. 26, 2015

(51) Int. Cl.

| | |
|---|---|
| ***G06F 7/00*** | (2006.01) |
| ***A61J 7/00*** | (2006.01) |
| ***A61J 1/03*** | (2006.01) |
| ***B65B 43/52*** | (2006.01) |
| ***B65B 57/04*** | (2006.01) |
| ***B65B 57/06*** | (2006.01) |
| ***B65B 5/10*** | (2006.01) |

(52) U.S. Cl.
CPC *A61J 7/0076* (2013.01); *A61J 1/03* (2013.01); *B65B 5/103* (2013.01); *B65B 43/52* (2013.01); *B65B 57/04* (2013.01); *B65B 57/06* (2013.01)

(58) Field of Classification Search
USPC .......................................................... 700/230
See application file for complete search history.

(56) References Cited

U.S. PATENT DOCUMENTS 5,208,762 A 5/1993 Charhut et al.
5,660,305 A * 8/1997 Lasher .................. A61J 7/0084 221/124

(Continued)

FOREIGN PATENT DOCUMENTS

DE 102006030433 A1 11/2007
EP 0 680 880 A1 11/1995

(Continued)

OTHER PUBLICATIONS

International Search Report dated Sep. 18, 2012 issued in corresponding application No. PCT/JP2012/065103.
Extended European Search Report dated Dec. 21, 2015 issued in counterpart European Application No. 12878663.9 (7 pages).

*Primary Examiner* — Kyle Logan
(74) *Attorney, Agent, or Firm* — Westerman, Hattori, Daniels & Adrian, LLP

(57) ABSTRACT

There is provided a medicinal agent filling device with reduced size, which can automatically fill a medicinal agent into containers having different sizes. A medicinal agent filling device includes: a supply device for supplying a medicinal agent of interest to a container capable of being filled with the medicinal agent; a conveyance device for conveying the container; and a detecting unit for obtaining measurement data corresponding to an outer diameter of the container in a conveyance direction of the container by the conveyance device. Based on the measurement data, the conveyance device stops the container at a supply position where the medicinal agent can be supplied from the supply device to the container.

9 Claims, 13 Drawing Sheets

(56) References Cited

U.S. PATENT DOCUMENTS

| | | | | |
|---|---|---|---|---|
| 5,771,657 | A * | 6/1998 | Lasher | B65B 61/20 53/131.4 |
| 7,765,776 | B1 * | 8/2010 | Leu | B65B 5/045 53/131.4 |
| 2004/0162632 | A1 | 8/2004 | Prutu | |
| 2009/0064638 | A1 * | 3/2009 | Corbett | B65B 55/20 53/472 |
| 2010/0154928 | A1 | 6/2010 | Taniguchi et al. | |
| 2010/0275556 | A1 | 11/2010 | Michelli et al. | |
| 2013/0110282 | A1 * | 5/2013 | Omura | G07F 17/0092 700/233 |

FOREIGN PATENT DOCUMENTS

| | | | |
|---|---|---|---|
| JP | 6-127635 | A | 5/1994 |
| JP | 11-124234 | A | 5/1999 |
| JP | 2010-36946 | A | 2/2010 |

* cited by examiner

MEDICINAL AGENT FILLING DEVICE

TECHNICAL FIELD

The present invention relates to a medicinal agent filling device, and particularly to a medicinal agent filling device for filling a medicinal agent into a container.

BACKGROUND ART

With regard to a device for filling a medicinal agent into a container, there has been conventionally proposed a method and a device for blending, in which various drugs are stored in three or more lines, and one vial size is allocated to each line, and at the time of filling of a prescription, the prescription is automatically allocated to one line and the processing is performed in accordance therewith from the viewpoint of the required vial size, thereby preparing for the case in which filling of the prescription is impossible, and then, all prescriptions of patients are collected and prepared as a single order (refer to, for example, Japanese Patent Laying-Open No. 6-127635 (PTD 1)).

CITATION LIST

Patent Document

PTD 1: Japanese Patent Laying-Open No. 6-127635

SUMMARY OF INVENTION

Technical Problem

The size of the vial filled with the medicinal agent varies depending on an amount of prescribed medicinal agent or a size of the medicinal agent. It is desirable that a medicinal agent filling device should be provided to be capable of automatically filling a medicinal agent into vials having different sizes. The device described in Japanese Patent Laying-Open No. 6-127635 (PTD 1) can be adapted to vials having different sizes. However, the line for automatically filling the drug into the vial is provided for each vial size, which resulted in an increase in size of the device.

The present invention has been made in light of the aforementioned problem, and a main object of the present invention is to provide a small-sized medicinal agent filling device that can automatically fill a medicinal agent into containers having different sizes.

Solution to Problem

A medicinal agent filling device according to the present invention includes: a supply device for supplying a medicinal agent of interest to a container capable of being filled with the medicinal agent; a conveyance device for conveying the container; and a detecting unit for obtaining measurement data corresponding to an outer diameter of the container in a conveyance direction of the container by the conveyance device. Based on the measurement data, the conveyance device stops the container at a supply position where the medicinal agent can be supplied from the supply device to the container.

In the medicinal agent filling device, the detecting unit may obtain the measurement data of the container located on a conveyance path by the conveyance device. The detecting unit may obtain the measurement data of the container that is being conveyed by the conveyance device.

In the medicinal agent filling device, the detecting unit may include a sensor for detecting the container located at the supply position. When a state changes from a state in which the sensor detects the container to a state in which the sensor no longer detects the container, the conveyance device may convey the container in a reverse direction by a distance corresponding to one half of the outer diameter and stop the container. The conveyance device may simultaneously convey a plurality of the containers spaced apart from one another in the conveyance direction, the detecting unit may obtain the measurement data of the container that first reaches the supply position, and when the sensor detects second and subsequent ones of the containers, the conveyance device may convey the container by a distance corresponding to one half of the outer diameter and stop the container.

In the medicinal agent filling device, the detecting unit may include a sensor for detecting the container located on more upstream side than the supply position. The medicinal agent filling device may further include a second sensor for detecting the container located at the supply position, and when the second sensor detects the container, the conveyance device may convey the container by a distance corresponding to one half of the outer diameter and stop the container.

The medicinal agent filling device may further include a holding body capable of holding the plurality of the containers with spacings in the conveyance direction. The holding body may be provided to be capable of holding the containers different in the outer diameter.

Advantageous Effects of Invention

According to the medicinal agent filling device of the present invention, the medicinal agent can be automatically filled into the containers having different sizes, and the medicinal agent filling device can be reduced in size.

DESCRIPTION OF EMBODIMENTS

Figure 1:
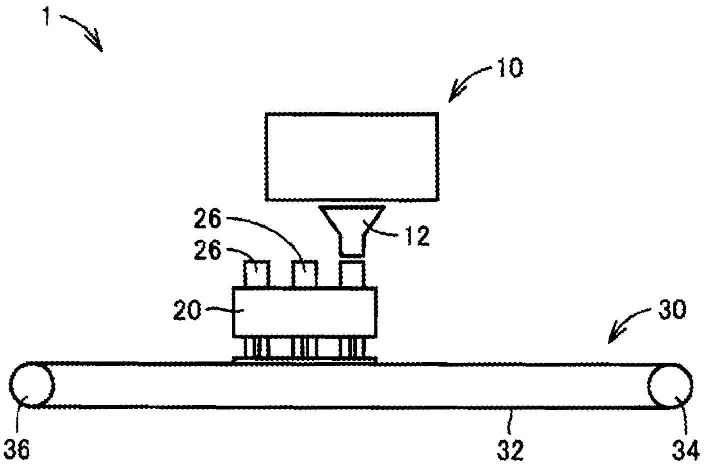
FIG. 1 is a side view showing a schematic configuration of a medicinal agent filling device according to a first embodiment.

Embodiments of the present invention will be described hereinafter with reference to the drawings, in which the same or corresponding portions are denoted by the same reference numerals and description thereof will not be repeated.

First Embodiment

Figure 2:
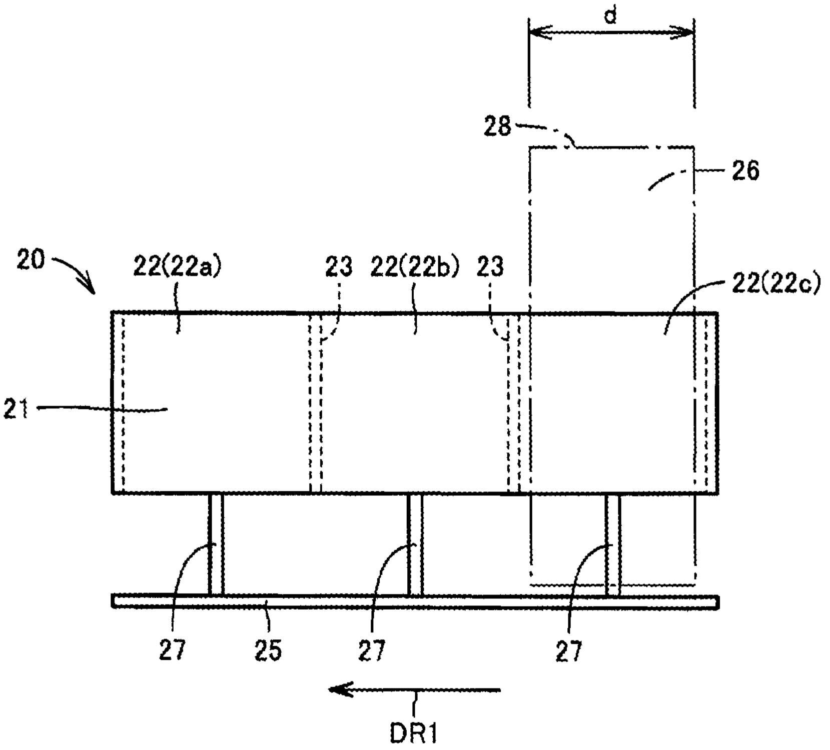
FIG. 2 is an enlarged view of a holding body shown in FIG. 1.
Figure 3:
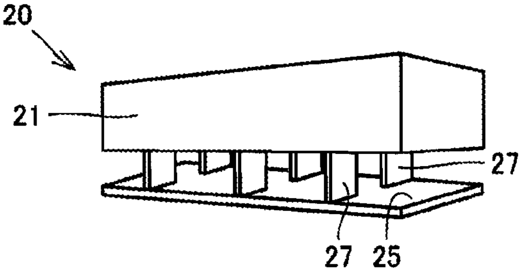
FIG. 3 is a perspective view of the holding body when viewed from a different angle.
Figure 4:
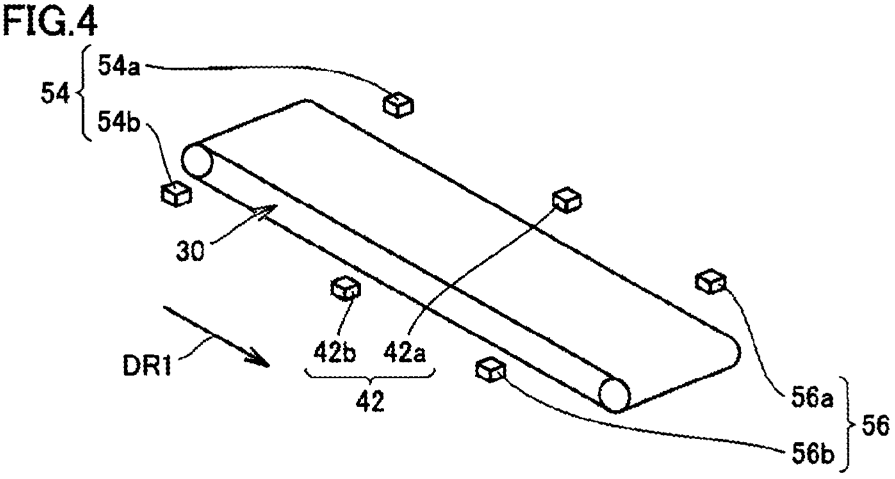
FIG. 4 is a schematic view showing arrangement of sensors with respect to a conveyance device.
Figure 5:
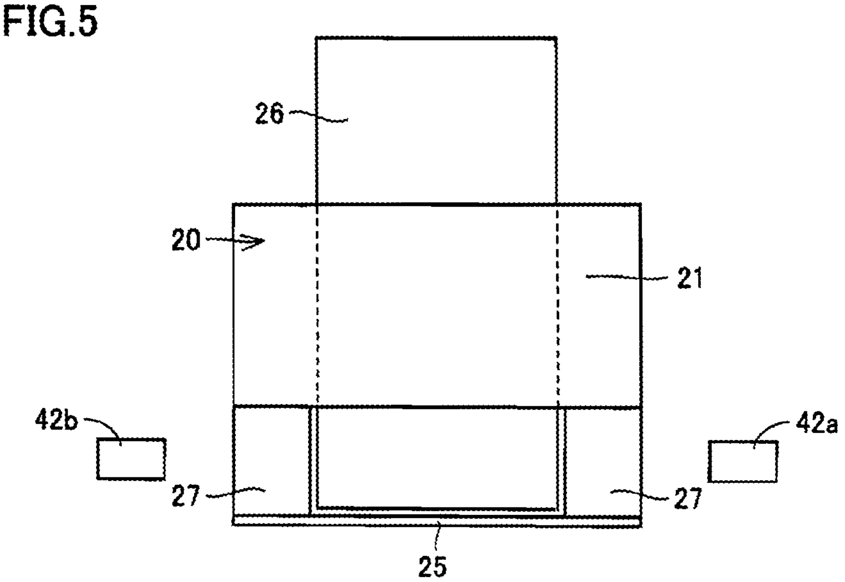
FIG. 5 is a schematic view showing arrangement of the sensor with respect to the holding body and a container.

FIG. 1 is a side view showing a schematic configuration of a medicinal agent filling device 1 according to a first embodiment. FIG. 2 is an enlarged view of a holding body 20 shown in FIG. 1. FIG. 3 is a perspective view of holding body 20 when viewed from a different angle. FIG. 4 is a schematic view showing arrangement of sensors with respect to a conveyance device 30. FIG. 5 is a schematic view showing arrangement of the sensor with respect to holding body 20 and a container 26. First, the schematic configuration of medicinal agent filling device 1 will be described with reference to FIGS. 1 to 5.

Medicinal agent filling device 1 is a device for automating a work for filling, into container 26, a solid medicinal agent such as a tablet or a capsule, or a medicinal agent packaged individually according to dosage unit. Medicinal agent filling device 1 includes a supply device 10 for supplying the medicinal agent of interest to container 26, and conveyance device 30 for conveying container 26 held by holding body 20. Container 26 has a substantially cylindrical outer shape. Container 26 in the first embodiment is a bottomed cylindrical vial. As long as the medicinal agent of interest can be filled into container 26, the shape of container 26 is not limited to the substantially cylindrical shape. For example, container 26 may have a rectangular box-like outer shape that is relatively small in thickness, or container 26 having another arbitrary shape may be used.

Supply device 10 has medicinal agent cassettes that house various types of medicinal agents according to type. The medicinal agent cassette is provided in supply device 10 in a freely attachable/detachable manner. Supply device 10 may be a device that can simultaneously hold a plurality of medicinal agent cassettes such as, for example, 128 or 256 medicinal agent cassettes. In this case, a plurality of medicinal agents can be easily dispensed from supply device 10 according to type, and thus, in accordance with a prescription including a plurality of medicinal agents, the dispense of the medicinal agents can be completed in a short time. Alternatively, supply device 10 may be configured such that supply device 10 can hold one medicinal agent cassette and the user using the device replaces a necessary medicinal agent cassette as the need arises. In this case, supply device 10 can be reduced in size, and thus, cost reduction and space savings of supply device 10 can be achieved.

A discharge port from which the medicinal agent is discharged is provided on the bottom of supply device 10, and a hopper 12 is arranged at a position facing this discharge port. The medicinal agent dispensed from the medicinal agent cassette is discharged from the discharge port, passes through hopper 12 provided below supply device 10 and further falls, and is supplied to container 26.

Conveyance device 30 conveys container 26 held by holding body 20, and thereby, container 26 moves under supply device 10. On the upper side of each container 26, an upper opening 28 that causes the inside and the outside of container 26 to communicate with each other is formed. With container 26 being arranged at an appropriate position (a supply position L that will be described in detail below) where upper opening 28 of container 26 faces hopper 12, the medicinal agent falls from supply device 10, passes through hopper 12 and is filled into container 26. The medicinal agent falling from supply device 10 passes through upper opening 28 and enters into container 26, and is received by container 26. The medicinal agent is supplied from supply device 10 to container 26 arranged at the supply position, and thus, an appropriate quantity of medicinal agent is filled into container 26.

Holding body 20 includes a main body portion 21 having a substantially rectangular box-like outer shape, a bottom plate 25 provided below main body portion 21, and a pillar 27 rising from bottom plate 25 and supporting main body portion 21. Main body portion 21 has a plurality of holding sections 22, each of which can hold container 26. One holding section 22 holds one container 26, and holding body 20 having the plurality of holding sections 22 holds a plurality of containers 26 as a whole. The plurality of containers 26 are arranged in the movement direction (a conveyance direction DR1 indicated by an arrow in FIG. 2) of holding body 20 conveyed by conveyance device 30, and are held by holding body 20. The plurality of holding sections 22 are formed to be arranged in conveyance direction DR1.

The interior space of main body portion 21 of holding body 20 shown in FIG. 2 is divided into three sections by partition walls 23, and each of the three sections is provided to be capable of housing container 26. As a result, holding body 20 is provided with three holding sections 22*a*, 22*b* and 22*c*. Openings are formed on the upper end side of and in the lower end of holding sections 22*a*, 22*b* and 22*c*. Each of holding sections 22*a*, 22*b* and 22*c* is formed to have such a tubular shape that the ceiling side and the bottom side are open. When the plurality of containers 26 are housed in holding body 20, the plurality of containers 26 are spaced apart from one another in conveyance direction DR1 and are held by holding body 20.

Container 26 penetrates through holding section 22 in the vertical direction, and extends from the inside of main body portion 21 through the opening on the ceiling side to the outside above main body portion 21 and extends through the opening on the bottom side of main body portion 21 to the outside below main body portion 21. An upper end of container 26 is arranged outside holding body 20. A lower end of container 26 is in contact with bottom plate 25 and supported by bottom plate 25, such that container 26 is placed on bottom plate 25.

Pillar 27 is provided between main body portion 21 and bottom plate 25. Pillar 27 has a flat plate-like shape and extends in the direction of the normal to a surface of flat plate-like bottom plate 25. An upper end of pillar 27 is coupled to main body portion 21 and a lower end of pillar 27 is coupled to bottom plate 25. Main body portion 21 is fixed by a plurality of pillars 27 and is supported above bottom plate 25 with a spacing between main body portion 21 and bottom plate 25. Pillar 27 is coupled to main body portion 21 at a position where pillar 27 does not interfere with tubular holding section 22 formed in main body portion 21.

Conveyance device 30 moves container 26 held by holding section 22 of holding body 20 to the supply position at which the medicinal agent can be supplied from supply device 10 to container 26. When holding body 20 holds a plurality of containers 26, conveyance device 30 sequentially moves the plurality of containers 26 to the supply position at which the medicinal agent can be supplied from supply device 10, and temporarily stops holding body 20 to supply the medicinal agent to container 26 arranged at the supply position.

Conveyance device 30 shown in FIGS. 1 and 4 is a known belt conveyor having a belt 32 and a pair of pulleys 34 and 36. Holding body 20 is placed on the upper side of belt 32. By movement of belt 32 with rotational motion of pulleys 34 and 36, container 26 is conveyed in conveyance direction DR1. Conveyance device 30 in the present embodiment conveys container 26 in conveyance direction DR1. Conveyance direction DR1 is the direction from one to the other of the pair of pulleys 34 and 36 provided at opposing ends of belt 32, e.g., the direction from pulley 34 to pulley 36.

Conveyance device 30 may be capable of conveying container 26 in both directions. Namely, in addition to conveyance direction DR1 described above, conveyance device 30 may also be capable of conveying container 26 in the direction from the other to one of the pair of pulleys 34 and 36, which is opposite to conveyance direction DR1, e.g., the direction from pulley 36 to pulley 34. Conveyance device 30 is configured to be capable of conveying container 26 in both directions and to be capable of switching the conveyance direction of container 26, and thus, the user using medicinal agent filling device 1 can select any one of the directions as conveyance direction DR1. As a result, in accordance with the situation of actual placement of medicinal agent filling device 1, container 26 can be conveyed in more appropriate direction to fill the medicinal agent into container 26.

Conveyance device 30 is not limited to the belt conveyor. Conveyance device 30 may have any configurations as long as it can convey container 26 in conveyance direction DR1. For example, conveyance device 30 may be configured such that a robot arm capable of making fine adjustments of the position in conveyance direction DR1 is included and this robot arm holds container 26 and moves container 26 in conveyance direction DR1.

As shown in FIG. 4, medicinal agent filling device 1 includes three sets of detecting units for detecting container 26, i.e., an upstream side detecting unit 54, a downstream side detecting unit 56 and a container outer diameter detecting unit 42. Upstream side detecting unit 54, container outer diameter detecting unit 42 and downstream side detecting unit 56 are arranged in this order in conveyance direction DR1. Upstream side detecting unit 54 is provided on the upstream side in conveyance direction DR1 with respect to container outer diameter detecting unit 42. Downstream side detecting unit 56 is provided on the downstream side in conveyance direction DR1 with respect to container outer diameter detecting unit 42. Medicinal agent filling device 1 includes container outer diameter detecting unit 42 for obtaining measurement data corresponding to an outer diameter d (refer to FIG. 2) of container 26 in conveyance direction DR1. Container outer diameter detecting unit 42 in the first embodiment has a function as a sensor for detecting container 26 located at the supply position.

When container 26 faces hopper 12 and is arranged at the supply position where the medicinal agent can be supplied from supply device 10 to container 26, container outer diameter detecting unit 42 detects container 26. Upstream side detecting unit 54 detects container 26 located at a conveyance start position where conveyance device 30 starts conveyance of container 26. Downstream side detecting unit 56 detects container 26 located at a conveyance end position where conveyance device 30 stops container 26 and ends conveyance of container 26.

Container outer diameter detecting unit 42 is a transmissive light sensor having a light emitting portion 42*a* and a light receiving portion 42*b*. Upstream side detecting unit 54 is a transmissive light sensor having a light emitting portion 54*a* and a light receiving portion 54*b*. Downstream side detecting unit 56 is a transmissive light sensor having a light emitting portion 56*a* and a light receiving portion 56*b*. The light generated by light emitting portions 42*a*, 54*a* and 56*a* is received by light receiving portions 42*b*, 54*b* and 56*b*, respectively.

As shown in FIG. 5, each of light emitting portion 42*a* and light receiving portion 42*b* is arranged at a position facing a side surface portion of container 26. Main body portion 21 and bottom plate 25 are coupled by pillars 27, and a gap through which the light can pass is formed between main body portion 21 and bottom plate 25. Container 26 is exposed to between main body portion 21 and bottom plate 25 of holding body 20 in the perpendicular direction (vertical direction in FIG. 5). As a result, the light generated by light emitting portion 42*a* of container outer diameter detecting unit 42 can be directly shed on an outer surface of container 26. The other light emitting portions 54*a* and 56*a* and light receiving portions 54*b* and 56*b* are also arranged at the same positions as the positions of light emitting portion 42*a* and light receiving portion 42*b* shown in FIG. 5 in the perpendicular direction.

The fact that the light generated by light emitting portions 42*a*, 54*a* and 56*a* is received by corresponding light receiving portions 42*b*, 54*b* and 56*b* means that container 26 is not present at the position where each detecting unit is provided. The fact that the light generated by any one of light emitting portions 42*a*, 54*a* and 56*a* is not received by corresponding light receiving portions 42*b*, 54*b* and 56*b* means that the light is blocked by container 26. Namely, container 26 is present at the position where the detecting unit having the light receiving portion that does not receive the light is provided. Container 26 is detected by any one of upstream side detecting unit 54, container outer diameter detecting unit 42 and downstream side detecting unit 56, and thereby, the current position of container 26 in conveyance direction DR1 is detected.

Belt 32 of conveyance device 30 provides a conveyance path for conveying container 26 in conveyance direction DR1. Container outer diameter detecting unit 42 detects container 26 located on the conveyance path provided by conveyance device 30. As a result, it is not necessary to separately provide equipment for detecting the outer diameter of container 26, and thus, the configuration of medicinal agent filling device 1 can be simplified and medicinal agent filling device 1 can be reduced in size. Container outer diameter detecting unit 42 can detect container 26 that is being conveyed by conveyance device 30 and can detect the outer diameter of container 26 during a series of steps of conveying container 26. Therefore, it is not necessary to separately provide a step for detecting the outer diameter of container 26 and the time required to fill the medicinal agent by using medicinal agent filling device 1 can be shortened.

Upstream side detecting unit 54, container outer diameter detecting unit 42 and downstream side detecting unit 56 shown in FIG. 4 are not limited to the light sensor and any type of sensors may be selected as appropriate. For example, a magnetic sensor capable of detecting a change in magnetic field may be used as each detecting unit, and magnets may be attached to container 26 to detect a change in magnetic field when container 26 comes close to the magnetic sensors, thereby detecting container 26.

Figure 6:
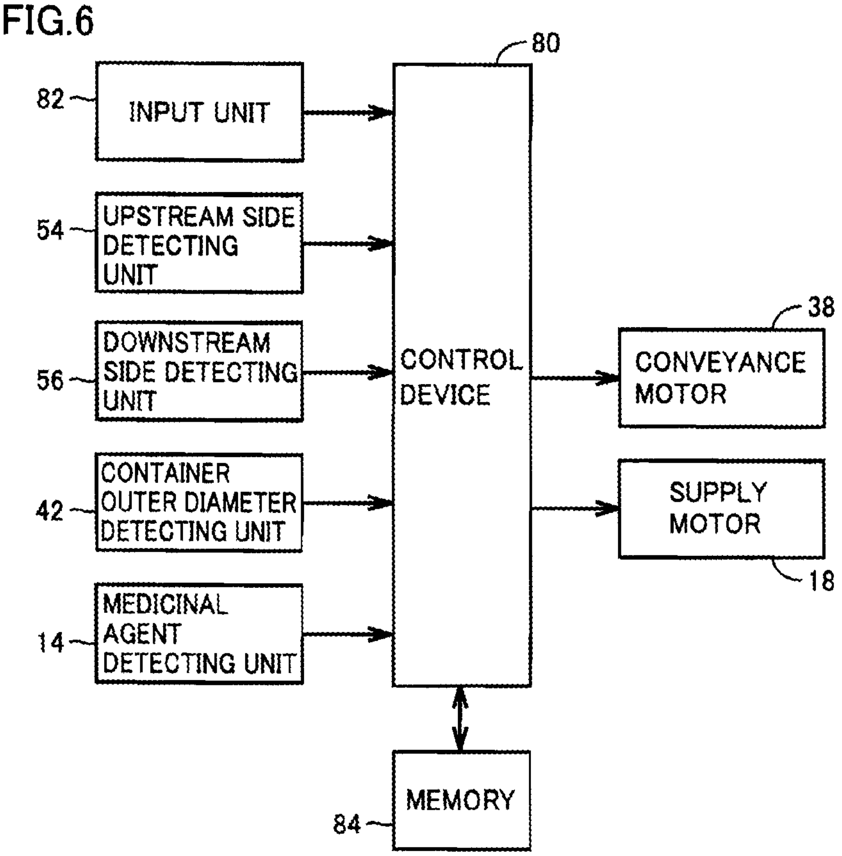
FIG. 6 is a block diagram showing a schematic configuration related to control of the medicinal agent filling device.

FIG. 6 is a block diagram showing a schematic configuration related to control of medicinal agent filling device 1. Medicinal agent filling device 1 includes a control device 80 for controlling the operation of supply device 10 and conveyance device 30. A result of detection by container outer diameter detecting unit 42, i.e., a signal indicating that container outer diameter detecting unit 42 has or has not detected container 26, is input to control device 80. A result of detection by upstream side detecting unit 54 and downstream side detecting unit 56, i.e., a signal indicating which position container 26 is located at in conveyance direction DR1, is input to control device 80.

Through an input unit 82 such as an input key or a touch panel, the user operating medicinal agent filling device 1 inputs, to control device 80, set values such as the conveyance direction of container 26 by conveyance device 30 and the quantity of medicinal agent filled into container 26. Supply device 10 has a medicinal agent detecting unit 14. Medicinal agent detecting unit 14 detects the medicinal agent actually supplied from supply device 10 to container 26. Medicinal agent detecting unit 14 is provided, for example, at the discharge port through which the medicinal agent is discharged from supply device 10, and detects the medicinal agent passing through the discharge port and falling. The information about the medicinal agent supplied from supply device 10 to container 26, which is detected by medicinal agent detecting unit 14, is input to control device 80.

Supply device 10 has a supply motor 18 that is a motive power source for performing the operation for discharging the medicinal agent from supply device 10. Conveyance device 30 has a conveyance motor 38 that is a motive power source for rotating any one of or both pulleys 34 and 36 and moving belt 32. Control device 80 transmits a control signal for controlling the number of rotations of supply motor 18 to supply motor 18, and transmits a control signal for controlling the number of rotations of conveyance motor 38 to conveyance motor 38.

A control program for operating medicinal agent filling device 1 is recorded in a memory 84. The set values input from input unit 82 to control device 80 and the results of detection input from the respective detecting units to control device 80 are also recorded in memory 84. Control device 80 reads data from memory 84 or writes data in memory 84 as needed. Based on the control program and the results of detection by the detecting units, control device 80 controls the operation of supply device 10 and controls the operation of conveyance device 30.

Figure 7:
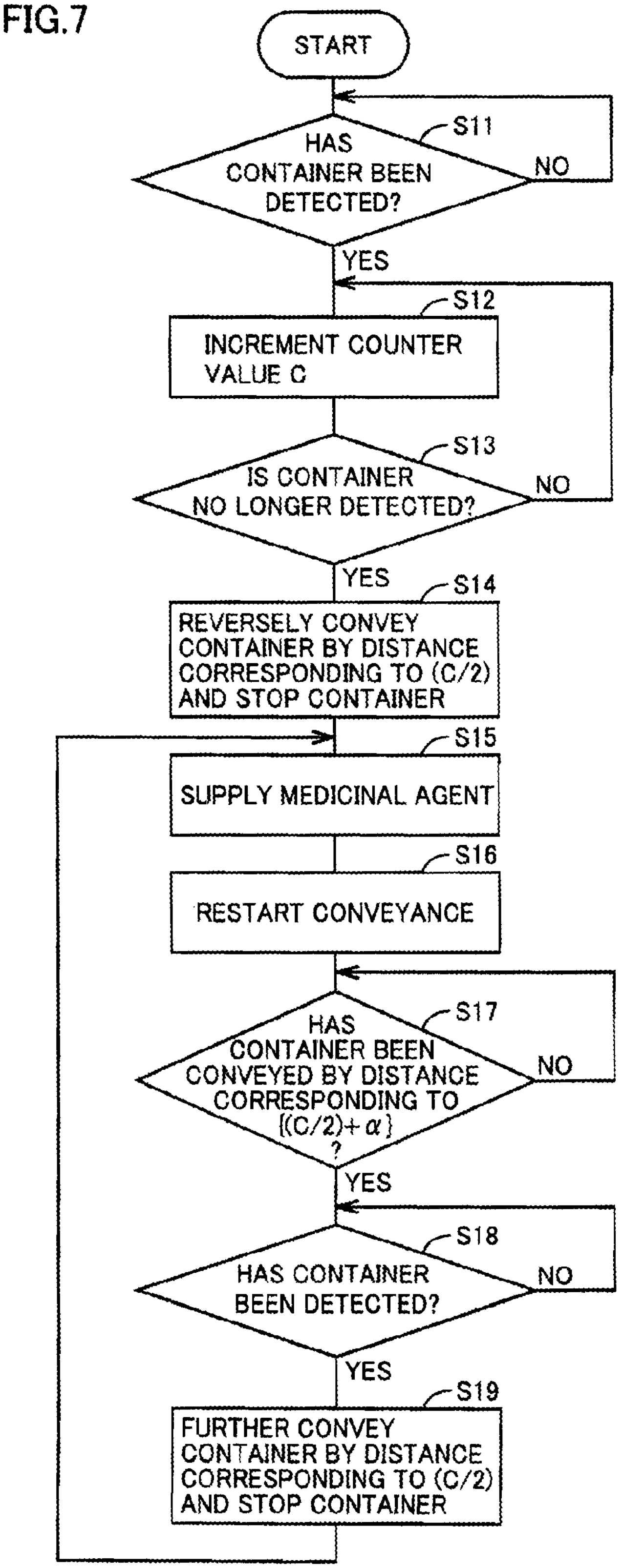
FIG. 7 is a flowchart showing each step of the operation for obtaining measurement data corresponding to an outer diameter of the container by using the sensor arranged at a medicinal agent supply position.

The operation of medicinal agent filling device 1 having the aforementioned configuration will be described below. FIG. 7 is a flowchart showing each step of the operation for obtaining the measurement data corresponding to outer diameter d of container 26 by using the sensor arranged at the medicinal agent supply position. In the example shown in FIG. 7, description will be given to the example in which conveyance device 30 simultaneously conveys a plurality of containers 26 held by holding body 20 and the plurality of containers 26 have fixed outer diameter d in conveyance direction DR1.

When container 26 is arranged at the conveyance start position where conveyance of container 26 should be started, the light emitted by light emitting portion 54*a* of upstream side detecting unit 54 is blocked by container 26 and light receiving portion 54*b* does not receive the light. As a result, upstream side detecting unit 54 detects that container 26 has been arranged at the conveyance start position. When control device 80 shown in FIG. 6 receives the detection result indicating that container 26 has been detected from upstream side detecting unit 54, control device 80 transmits a control signal for driving conveyance motor 38 to conveyance motor 38. In this manner, the conveyance of container 26 by conveyance device 30 is started.

When the conveyance of container 26 is started, it is determined in step (S11) whether container 26 has been detected at the supply position or not, as shown in FIG. 7. Container outer diameter detecting unit 42 described above is provided at the supply position, and while light receiving portion 42*b* is receiving the light generated by light emitting portion 42*a* of container outer diameter detecting unit 42, the light generated by light emitting portion 42*a* is not blocked by container 26 and container 26 is not detected at the supply position. While control device 80 is receiving the detection result indicating that container 26 is not detected at supply position L from container outer diameter detecting unit 42, control device 80 determines that container 26 is not present at the supply position.

Figure 8:
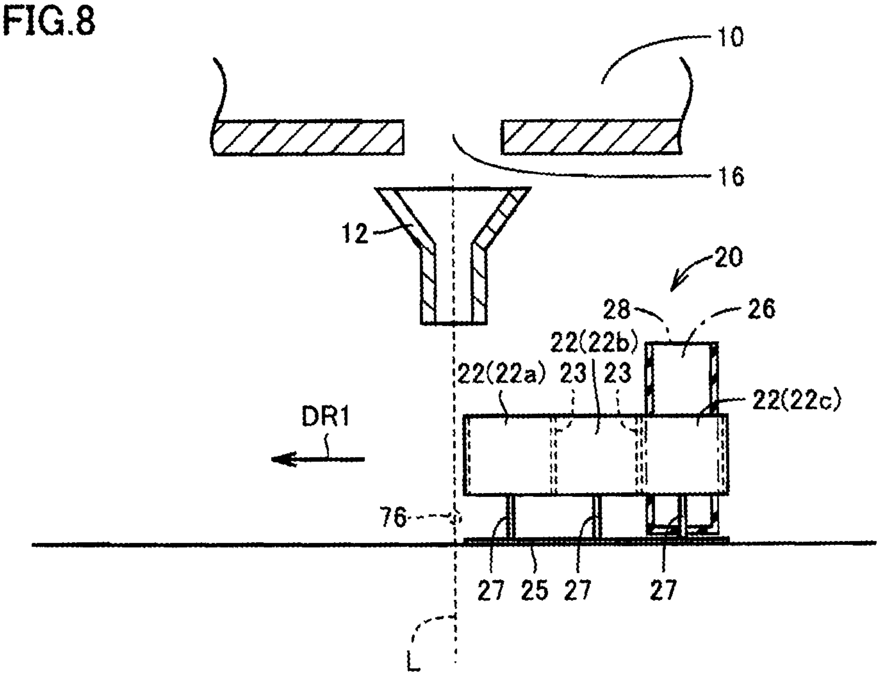
FIG. 8 is a partial cross-sectional view showing a state in which the container is conveyed on the upstream side of the supply position.

FIG. 8 is a partial cross-sectional view showing a state in which container 26 is conveyed on the upstream side of supply position L. Supply position L refers to a position of the center of container 26 in conveyance direction DR1 when container 26 is arranged at the position where hopper 12 of supply device 10 faces upper opening 28 of container 26 and the medicinal agent can be supplied to container 26. Therefore, supply position L indicated by a dotted line extending in the vertical direction in FIG. 8 extends through the center of hopper 12 in conveyance direction DR1. A state in which container 26 is arranged at supply position L refers to a state in which container 26 is arranged such that the center of container 26 in conveyance direction DR1 overlaps with supply position L indicated by the dotted line in FIG. 8.

Light 76 indicated by a dotted circle in FIG. 8 and the below-described figures represents a path of the light emitted by light emitting portion 42*a* of container outer diameter detecting unit 42. As shown in FIG. 8, light 76 emitted by light emitting portion 42*a* of container outer diameter detecting unit 42 provided at supply position L passes through supply position L.

As shown in FIG. 8, when container 26 conveyed in conveyance direction DR1 by conveyance device 30 has not yet reached supply position L, the light emitted by light emitting portion 42*a* of container outer diameter detecting unit 42 is not shed on container 26 and is received by light receiving portion 42*b*. As a result, it is determined that container 26 is not present at supply position L. Until container 26 reaches supply position L and container 26 is detected at supply position L, the determination in step (S11) is repeated.

Figure 9:
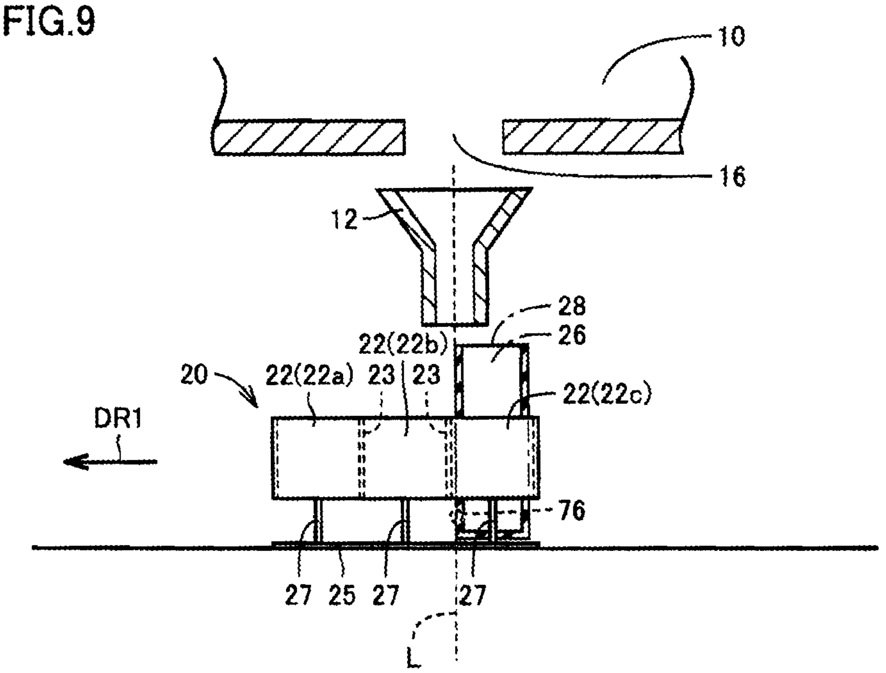
FIG. 9 is a partial cross-sectional view showing a state in which the sensor has started detection of the container.

FIG. 9 is a partial cross-sectional view showing a state in which the sensor has started detection of container 26. As shown in FIG. 9, when container 26 is conveyed to the position where the light generated by light emitting portion 42*a* of container outer diameter detecting unit 42 is blocked by container 26, light receiving portion 42*b* no longer detects the light. As a result, container 26 is detected at supply position L. Control device 80 receives the detection result indicating that container 26 has been detected at supply position L from container outer diameter detecting unit 42, and determines that container 26 has reached supply position L.

If container 26 is detected at the supply position, the process proceeds to step (S12) shown in FIG. 7. In step (S12), a counter value C is incremented. Namely, the arithmetic processing for increasing, by 1, counter value C which is an integer-type variable is performed. Here, conveyance device 30 is set to convey container 26 in conveyance direction DR1 at a constant speed. Since counter value C is increased on a program based on the premise that the conveyance speed of container 26 is constant, the increase in counter value C corresponds to a distance in conveyance direction DR1.

Next, in step (S13), it is determined whether container 26 is no longer detected at supply position L or not. If container 26 is not no longer detected, i.e., while container 26 is being detected at supply position L, in the determination in step (S13), the process returns to step (S12) and the incrementing of the counter value is continued.

Figure 10:
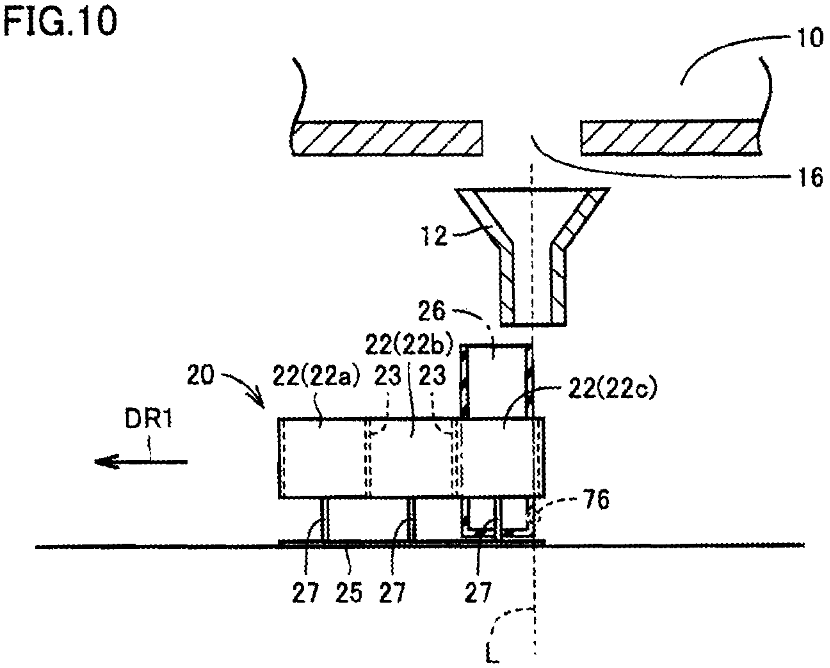
FIG. 10 is a partial cross-sectional view showing a state in which the sensor no longer detects the container.

FIG. 10 is a partial cross-sectional view showing a state in which the sensor no longer detects the container. When container 26 is conveyed in conveyance direction DR1 from the position shown in FIG. 9 and reaches a position shown in FIG. 10, the light generated by light emitting portion 42*a* of container outer diameter detecting unit 42 is no longer blocked by container 26 and light receiving portion 42*b* receives the light again. As a result, container 26 is not detected at supply position L. Control device 80, under the detection result by container outer diameter detecting unit 42, determines that container 26 is no longer detected at supply position L.

If, in step (S13), the state changes from the state in which container outer diameter detecting unit 42 detects container 26 to the state in which container outer diameter detecting unit 42 no longer detects container 26 and it is determined that container 26 is no longer detected, the process proceeds to step (S14) and conveyance device 30 conveys container 26 reversely.

Figure 11:
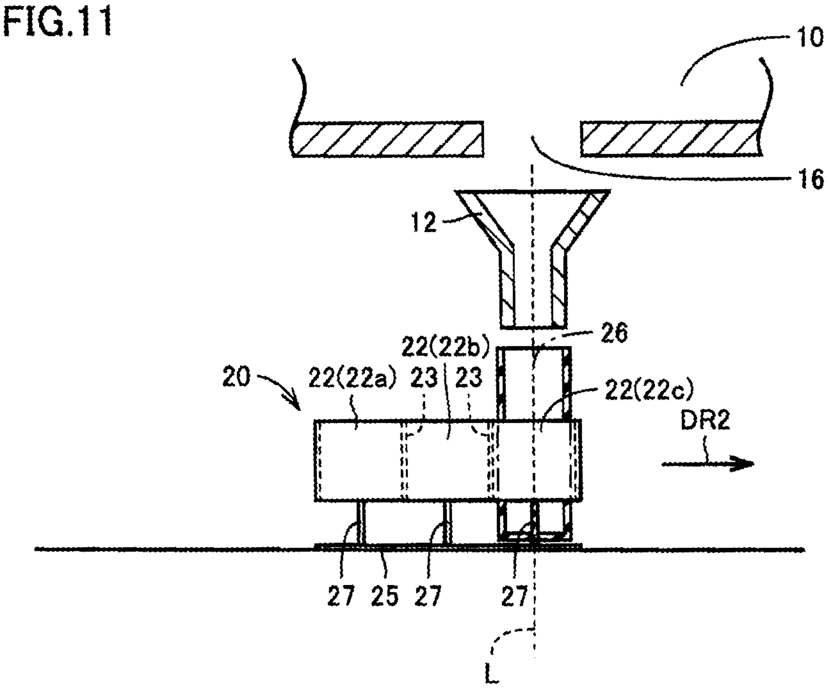
FIG. 11 is a partial cross-sectional view showing a state in which the container has been conveyed in the reverse direction to the supply position.

FIG. 11 is a partial cross-sectional view showing a state in which container 26 has been conveyed in the reverse direction to supply position L. When container 26 is no longer detected at supply position L, container 26 is conveyed in a reverse conveyance direction DR2 (indicated by an arrow in FIG. 11) opposite to conveyance direction DR1. A distance of reverse conveyance of container 26 at this time is defined as a distance corresponding to one half of the increased value obtained by incrementing counter value C in step (S12) while container 26 is being detected at supply position L. When the value obtained by increasing counter value C in step (S12) is, for example, 10, container 26 is conveyed reversely by a distance corresponding to the counter value of 10÷2=5.

When container outer diameter detecting unit 42 starts detection of container 26, the incrementing of counter value C is started. When container outer diameter detecting unit 42 no longer detects container 26, the incrementing of counter value C ends. Namely, while container outer diameter detecting unit 42 is detecting container 26, the incrementing of counter value C is continued. Therefore, the increased value obtained by incrementing counter value C can be regarded as the measurement data corresponding to the outer diameter of container 26 in conveyance direction DR1.

Therefore, reversely conveying container 26 by the distance corresponding to one half of the incremented value of counter value C means conveying container 26 in reverse conveyance direction DR2 by a distance corresponding to one half of the outer diameter of container 26. After this reverse conveyance is completed, container 26 is stopped. As a result, the center of container 26 in conveyance direction DR1 is aligned with supply position L, which provides the state shown in FIG. 11 in which the upper opening of container 26 faces hopper 12 of supply device 10. Arranging container 26 at the position shown in FIG. 11 means arranging container 26 at supply position L where the medicinal agent can be supplied to container 26.

Figure 12:
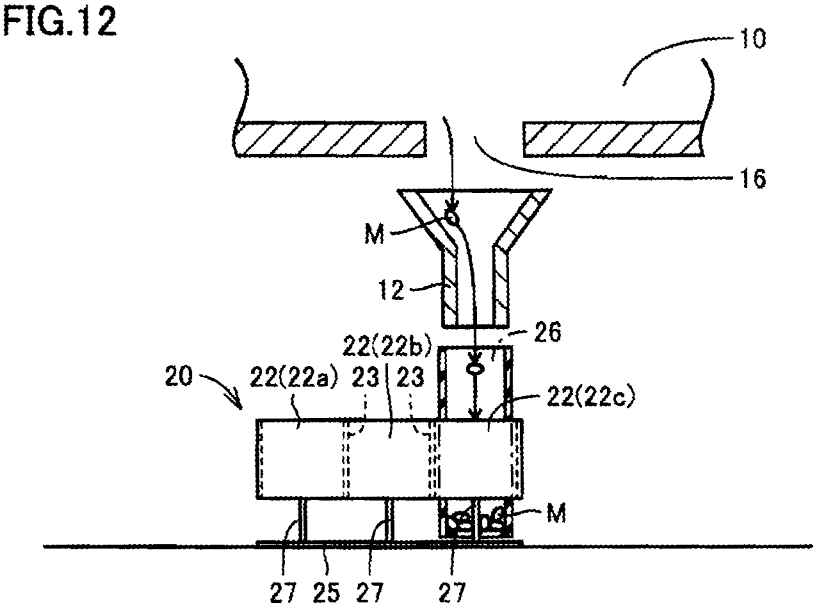
FIG. 12 is a partial cross-sectional view showing a state in which a medicinal agent is supplied to the container arranged at the supply position.

When container 26 is arranged at supply position L, the process proceeds to step (S15) and the medicinal agent is supplied to container 26. FIG. 12 is a partial cross-sectional view showing a state in which a medicinal agent M is supplied to container 26 arranged at supply position L. Control device 80 shown in FIG. 6 controls supply device 10 such that medicinal agent M is supplied to container 26 located at supply position L. Specifically, the control signal for driving supply motor 18 is transmitted from control device 80 to supply motor 18, and medicinal agent M is discharged from supply device 10.

Medicinal agent M is discharged from supply device 10 through a discharge port 16 formed in supply device 10, and medicinal agent M falling from supply device 10 is received by hopper 12. Medicinal agent M passes through hopper 12 and further falls, and is supplied through upper opening 28 formed in container 26, into container 26. In this manner, the prescribed type and quantity of medicinal agent M is filled into container 26. When the supply of the medicinal agent to container 26 is completed, the process proceeds to step (S16) and the conveyance of container 26 in conveyance direction DR1 is restarted.

Next, in step (S17), it is determined whether or not container 26 has been conveyed by a distance corresponding to a sum of a margin value $\alpha$ and one half of the incremented value of counter value C. The determination in step (S17) is continued until it is determined that container 26 has been conveyed by the distance corresponding to the sum of margin value $\alpha$ and one half of the incremented value of counter value C.

When the conveyance is restarted in step (S16), container 26 is present at supply position L. While container 26 is being conveyed by the distance corresponding to one half of the incremented value of counter value C after the restart of the conveyance, container outer diameter detecting unit 42 detects container 26 that has already been supplied with medicinal agent M at supply position L. Therefore, by determining that container 26 has been conveyed by the distance corresponding to the sum of margin value $\alpha$ and the distance corresponding to one half of the incremented value of counter value C (i.e., distance corresponding to one half of the outer diameter of container 26), container 26 that has already been supplied with the medicinal agent reliably moves away from supply position L. If container 26 is subsequently detected at supply position L, this detected container 26 is a container that is not filled with the medicinal agent.

If it is determined in step (S17) that container 26 has been conveyed by the distance corresponding to the sum of margin value α and one half of the incremented value of counter value C, the process next proceeds to step (S18) and it is determined whether container 26 has been detected at supply position L or not. The determination in step (S18) is continued until the next container 26 is detected at supply position L. If container 26 is detected in step (S18), the process proceeds to step (S19), and container 26 is further conveyed in conveyance direction DR1 by the distance corresponding to one half of the incremented value of counter value C (i.e., distance corresponding to one half of the outer diameter of container 26) and thereafter container 26 is stopped.

In this manner, the next container 26 is arranged at supply position L. The plurality of containers 26 conveyed by conveyance device 30 have a fixed outer diameter in conveyance direction DR1, and the measurement data corresponding to the outer diameter has already been obtained by container 26 that first reaches supply position L. Therefore, setting is made such that container 26 is conveyed by the distance corresponding to one half of the outer diameter of container 26 after the second and subsequent containers 26 are detected by container outer diameter detecting unit 42, and container 26 is stopped at this position. As a result, container 26 can be reliably stopped at supply position L and the medicinal agent can be supplied to container 26.

Figure 13:
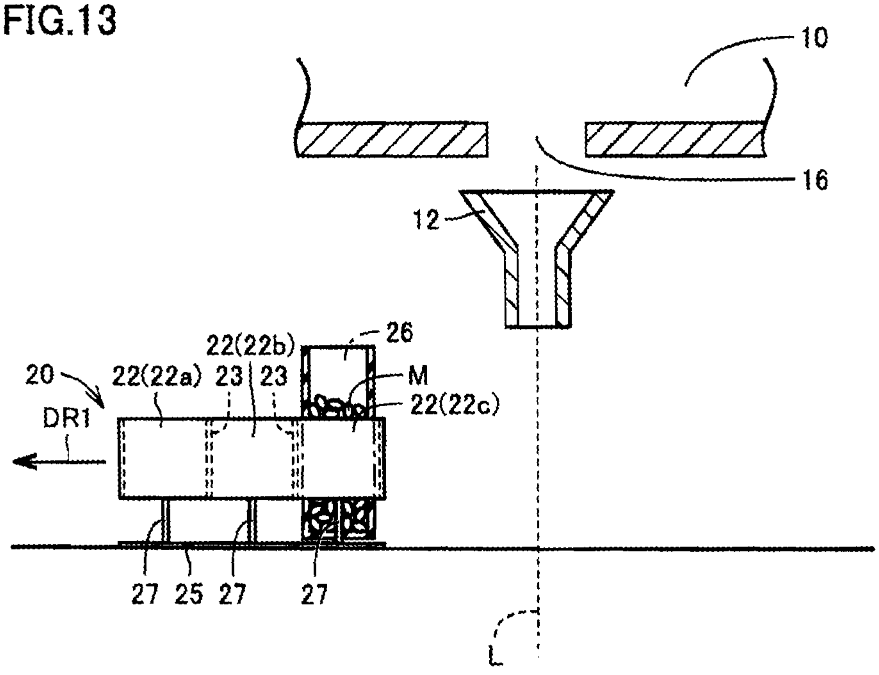
FIG. 13 is a partial cross-sectional view showing a state in which the container is conveyed after filling of the medicinal agent is completed.

When the supply of medicinal agent M to all containers 26 is completed, container 26 is conveyed in conveyance direction DR1 from supply position L, and the conveyance is continued until downstream side detecting unit 56 detects container 26. FIG. 13 is a partial cross-sectional view showing a state in which container 26 is conveyed after filling of medicinal agent M is completed. As shown in FIG. 13, container 26 filled with medicinal agent M is conveyed in conveyance direction DR1 to the conveyance end position.

Downstream side detecting unit 56 described above is provided at the conveyance end position. When container 26 reaches the conveyance end position and downstream side detecting unit 56 detects container 26, the conveyance of container 26 is stopped. Control device 80 receives the detection result indicating that downstream side detecting unit 56 has detected container 26 from downstream side detecting unit 56, and transmits a control signal for stopping conveyance motor 38 to conveyance motor 38, such that the conveyance of container 26 by conveyance device 30 is stopped. In this manner, the operation for medicinal agent filling device 1 to supply the medicinal agent from supply device 10 to container 26 is completed.

According to medicinal agent filling device 1 of the present embodiment described above, containers 26 are conveyed by conveyance device 30 and containers 26 are sequentially stopped at supply position L. In accordance with the measurement data corresponding to the outer diameter of container 26 in conveyance direction DR1, control device 80 controls conveyance device 30 such that container 26 is stopped at supply position L. Therefore, container 26 can be reliably stopped at the position where the medicinal agent can be supplied from supply device 10 to container 26. Since container 26 that can be filled with the medicinal agent is conveyed by conveyance device 30 and the medicinal agent can be automatically supplied from supply device 10 to container 26, the operator's time and effort when the operator fills the medicinal agent into container 26 can be significantly reduced.

Container outer diameter detecting unit 42 is used to obtain the measurement data corresponding to the outer diameter of container 26 in conveyance direction DR1, and container 26 is stopped at supply position L based on this measurement data. As a result, the size of container 26 actually conveyed by conveyance device 30 to automatically fill the medicinal agent can be detected and the conveyance of container 26 to supply position L can be controlled in accordance with the actual size of container 26. Therefore, according to medicinal agent filling device 1 of the present embodiment, each of containers 26 having different sizes can be stopped at supply position L, and the medicinal agent can be automatically supplied to container 26 at supply position L. Since medicinal agent filling device 1 includes only one conveyance device 30 and it is unnecessary to provide a plurality of conveyance devices adapted to containers 26 having different sizes, medicinal agent filling device 1 can be reduced in size.

Since container outer diameter detecting unit 42 is provided at supply position L and container outer diameter detecting unit 42 detects container 26, the measurement data corresponding to the outer diameter of container 26 is reliably obtained. When container 26 is no longer detected at supply position L after the measurement data corresponding to the outer diameter of container 26 is detected, container 26 is conveyed in reverse conveyance direction DR2 by the distance corresponding to one half of the outer diameter of container 26, and container 26 is stopped at supply position L. In this manner, container 26 can be reliably stopped at supply position L temporarily and the medicinal agent can be supplied from supply device 10 to container 26.

In the case where conveyance device 30 conveys the plurality of containers 26 and all containers 26 have a fixed outer diameter, the measurement data corresponding to the outer diameter of container 26 is obtained for container 26 at the head, and the conveyance and stop of the second and subsequent containers 26 are controlled based on this measurement data. As a result, the plurality of containers 26 can be sequentially stopped at supply position L and the medicinal agent can be automatically supplied to the plurality of containers 26 sequentially.

Figure 14:
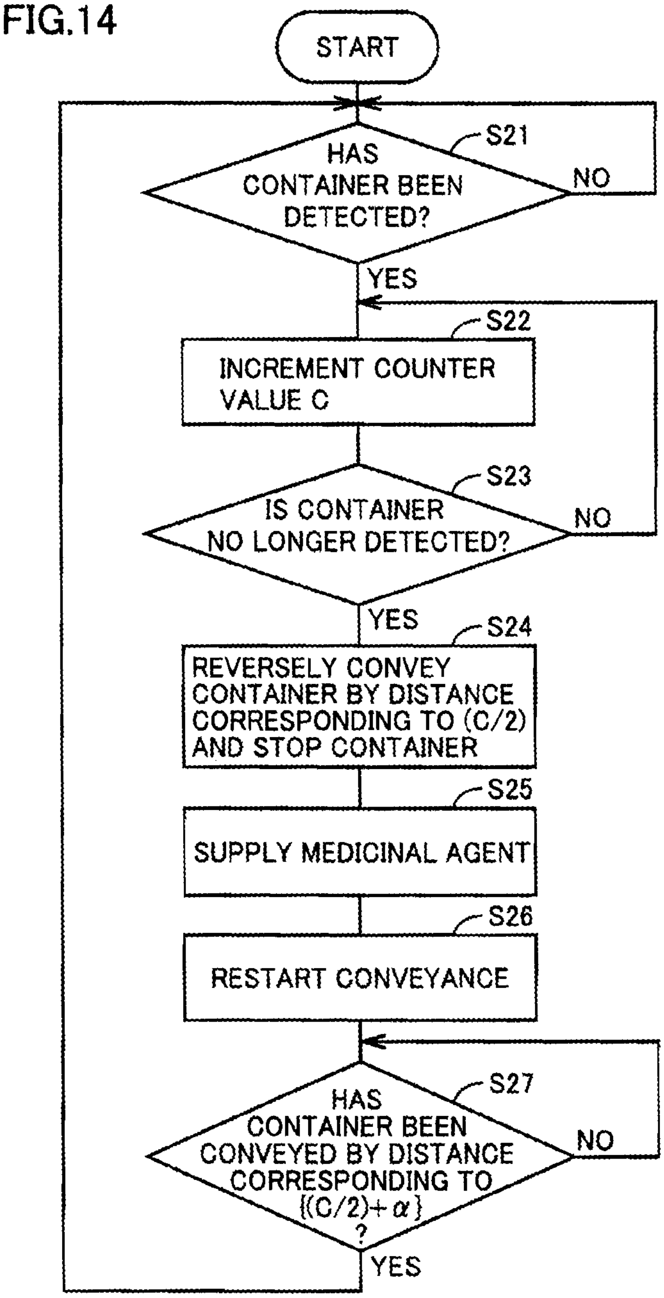
FIG. 14 is a flowchart showing each step of a first modification of the operation for obtaining the measurement data corresponding to the outer diameter of the container by using the sensor arranged at the medicinal agent supply position.

FIG. 14 is a flowchart showing each step of a first modification of the operation for obtaining the measurement data corresponding to the outer diameter of container 26 by using the sensor arranged at medicinal agent supply position L. In the first modification shown in FIG. 14, container outer diameter detecting unit 42 capable of detecting the measurement data corresponding to the outer diameter of container 26 at supply position L is used to detect the measurement data for each of the plurality of containers 26 conveyed by conveyance device 30.

Specifically, if it is determined in step (S27) shown in FIG. 14 that container 26 has been conveyed by the distance corresponding to the sum of margin value α and one half of the incremented value of counter value C, the process returns to step (S21). If container outer diameter detecting unit 42 detects the next container 26, measurement data corresponding to an outer diameter of the next container 26 is next detected in steps (S22) and (S23). Based on this measurement data, the next container 26 is stopped at supply position L (step (S24)) and the medicinal agent is supplied to the next container 26 (step (S25)).

Figure 15:
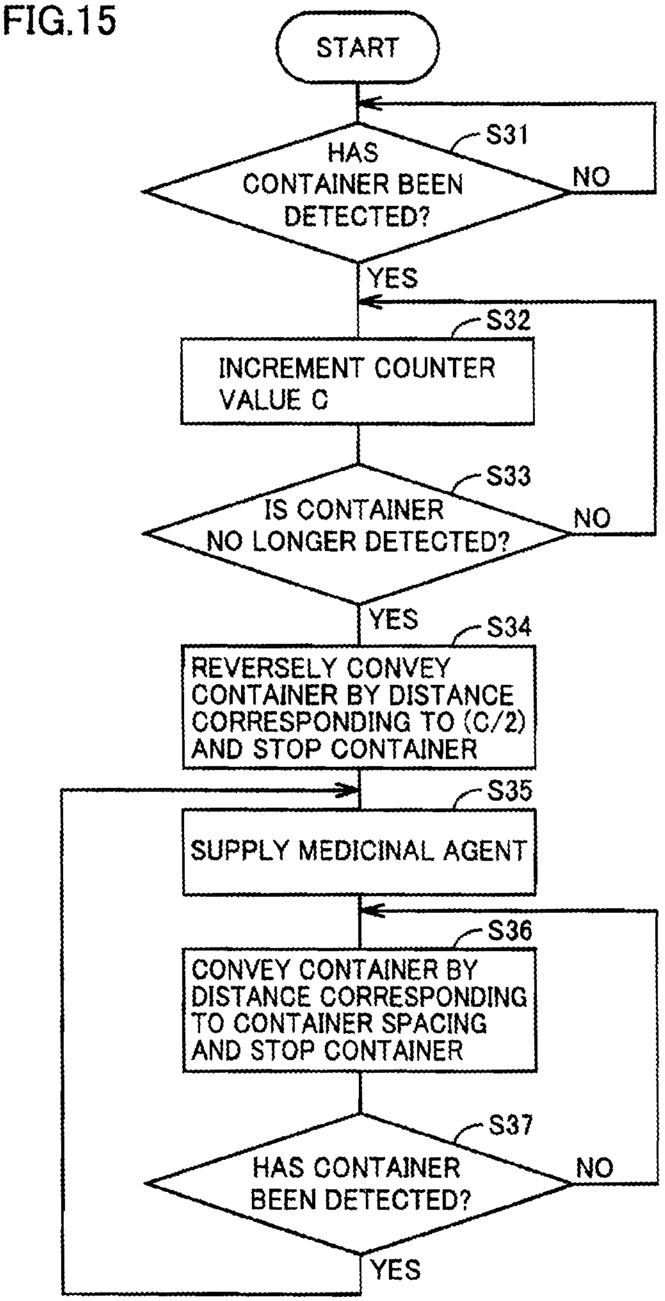
FIG. 15 is a flowchart showing each step of a second modification of the operation for obtaining the measurement data corresponding to the outer diameter of the container by using the sensor arranged at the medicinal agent supply position.

FIG. 15 is a flowchart showing each step of a second modification of the operation for obtaining the measurement data corresponding to the outer diameter of container 26 by using the sensor arranged at medicinal agent supply position L. In the second modification shown in FIG. 15, the plurality of containers 26 conveyed by conveyance device 30 are arranged at regular spacings in conveyance direction DR1. The regular spacings in this case mean that a distance in conveyance direction DR1 between the centers of containers 26 arranged in conveyance direction DR1 is fixed. When the supply of the medicinal agent to container 26 is completed, container 26 is conveyed by a distance corresponding to the spacing between containers 26, and it is determined whether to detect the next container 26 or not.

Specifically, when the supply of the medicinal agent in step (S35) shown in FIG. 15 is completed, conveyance device 30 next conveys container 26 by the distance corresponding to the spacing between containers 26 and stops container 26 in step (S36). The spacing between containers 26 can be input by the operator into control device 80 through input unit 82 (refer to FIG. 6). Next, determination in step (S37) is made, and if container 26 is not detected at the position where container 26 has been stopped in step (S36), the process returns to step (S36) and the conveyance of container 26 is repeated. If container 26 is detected at the position where container 26 has been stopped in step (S36), the process returns to step (S35) and the medicinal agent is supplied to detected container 26.

Second Embodiment

Figure 16:
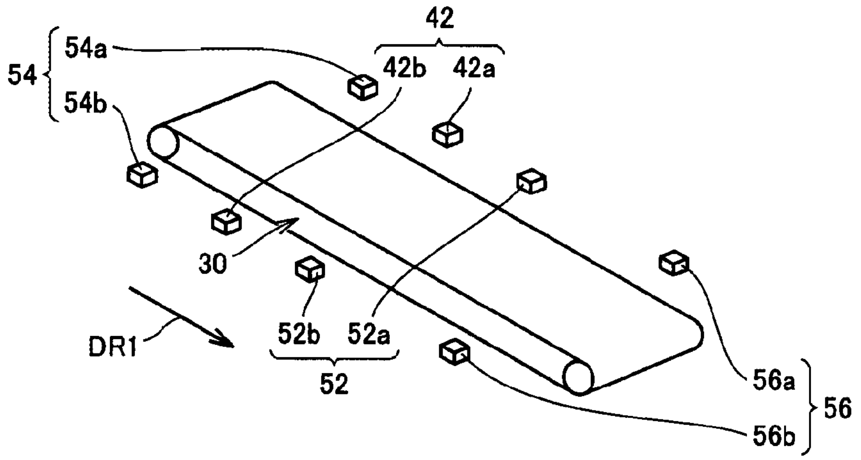
FIG. 16 is a schematic view showing arrangement of sensors with respect to a conveyance device of a medicinal agent filling device according to a second embodiment.
Figure 17:
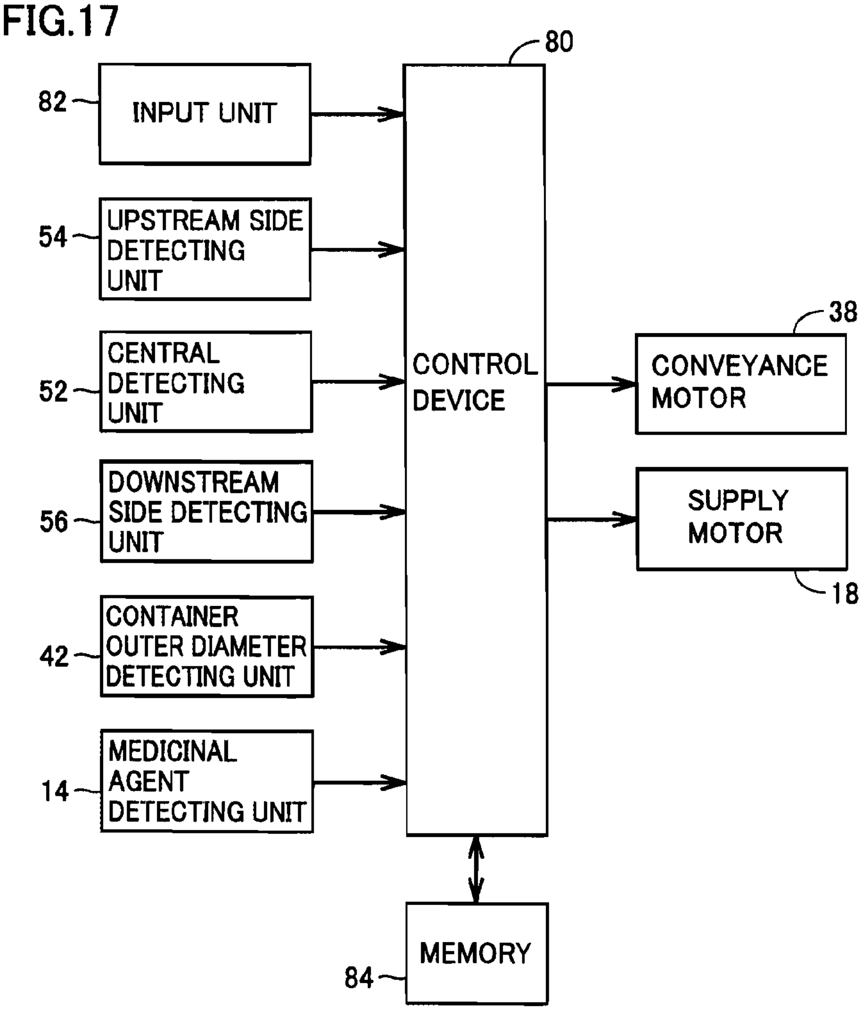
FIG. 17 is a block diagram showing a schematic configuration related to control of the medicinal agent filling device according to the second embodiment.

FIG. 16 is a schematic view showing arrangement of sensors with respect to conveyance device 30 of medicinal agent filling device 1 according to a second embodiment. FIG. 17 is a block diagram showing a schematic configuration related to control of medicinal agent filling device 1 according to the second embodiment. Medicinal agent filling device 1 according to the second embodiment is different from medicinal agent filling device 1 according to the first embodiment in that medicinal agent filling device 1 according to the second embodiment includes a central detecting unit 52 as shown in FIGS. 16 and 17. Central detecting unit 52 is a transmissive light sensor having a light emitting portion 52*a* and a light receiving portion 52*b*. The light generated by light emitting portion 52*a* is received by light receiving portion 52*b*. Each of light emitting portion 52*a* and light receiving portion 52*b* is arranged at a position facing the side surface portion of container 26 exposed to between main body portion 21 and bottom plate 25 of holding body 20 in the perpendicular direction.

Central detecting unit 52 detects container 26 arranged at supply position L. Central detecting unit 52 detects container 26, and thereby, it is detected that container 26 is located at supply position L. Unlike the first embodiment, container outer diameter detecting unit 42 in the second embodiment is provided on the upstream side in conveyance direction DR1 with respect to supply position L. Container outer diameter detecting unit 42 has a function as a sensor for detecting container 26 located at a container outer diameter detection position on more upstream side than supply position L. Central detecting unit 52 has a function as a second sensor for detecting container 26 located at supply position L.

Figure 18:
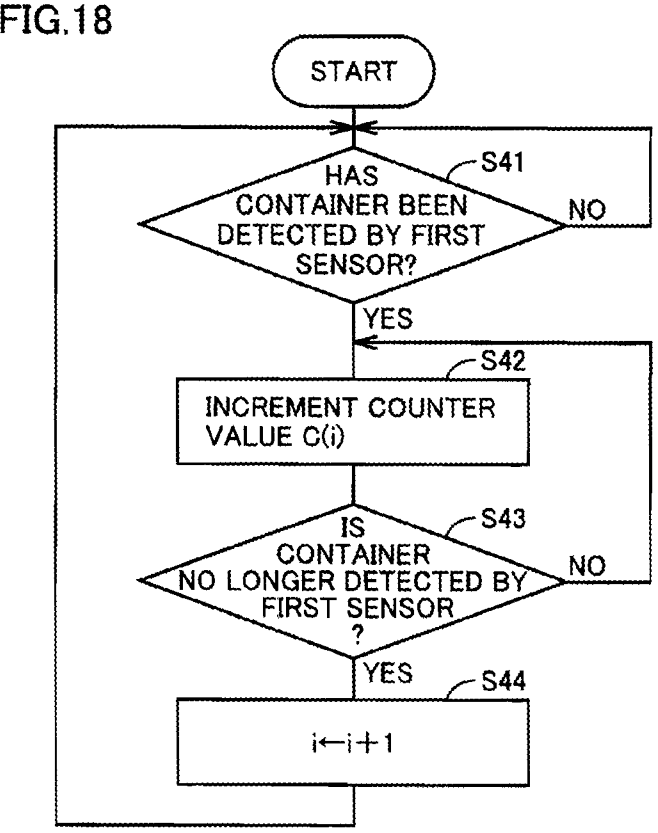
FIG. 18 is a flowchart showing each step of the operation for obtaining the measurement data corresponding to the outer diameter of the container by using the sensor arranged on more upstream side than the medicinal agent supply position.

FIG. 18 is a flowchart showing each step of the operation for obtaining the measurement data corresponding to the outer diameter of container 26 by using the sensor arranged on more upstream side than medicinal agent supply position L. FIG. 18 illustrates the operation for obtaining the measurement data corresponding to outer diameter d of container 26 in conveyance direction DR1 for each of the plurality of containers 26 conveyed by conveyance device 30, by using container outer diameter detecting unit 42 arranged at the container outer diameter detection position on more frontward side than medicinal agent supply position L. First sensor shown in FIG. 18 refers to container outer diameter detecting unit 42 provided on more frontward side than supply position L.

When the conveyance of container 26 by conveyance device 30 is started, it is determined in step (S41) whether container 26 has been detected at the container outer diameter detection position or not, as shown in FIG. 18. While light receiving portion 42*b* is receiving the light generated by light emitting portion 42*a* of container outer diameter detecting unit 42, the light generated by light emitting portion 42*a* is not blocked by container 26 and container 26 is not detected at the container outer diameter detection position. While control device 80 is receiving the detection result indicating that container 26 is not detected at the container outer diameter detection position from container outer diameter detecting unit 42, control device 80 determines that container 26 is not present at the container outer diameter detection position. The determination in step (S41) is repeated until container 26 reaches the container outer diameter detection position and container 26 is detected at the container outer diameter detection position.

If container 26 is detected at the container outer diameter detection position, the process proceeds to step (S42) and a counter value C(i) is incremented. "i" herein is an integer that is equal to or larger than 1. A value of i is allocated to each of the plurality of containers 26 conveyed by conveyance device 30, and is defined as i=1, 2, 3, . . . in order from container 26 at the head in conveyance direction DR1. As a result, different counter values can be stored for the plurality of containers 26, respectively. By using corresponding counter value C(i), each container 26 is controlled to move to supply position L.

Next, in step (S43), it is determined whether container 26 is no longer detected at the container outer diameter detection position or not. If container 26 is not no longer detected, i.e., while container 26 is being detected at the container outer diameter detection position, in the determination in step (S43), the process returns to step (S42) and the incrementing of the counter value is continued.

If it is determined in step (S43) that container 26 is no longer detected, the incrementing of counter value C(i) ends. Next, the process proceeds to step (S44) and 1 is added to i. Thereafter, the process returns to step (S41) and obtainment of the measurement data corresponding to the outer diameter of container 26 at the container outer diameter detection position is performed again. In this manner, a counter value C(1) for the first container 26 is recorded in memory 84, and counter values C(2) and C(3) for the second and third containers 26 are recorded, respectively, and a counter value C(i) for the i-th container 26 is recorded. These counter values C(1), C(2), . . . , C(i) are used in the operation for positioning container 26 at supply position L, as the measurement data corresponding to the outer diameter of container 26 in conveyance direction DR1.

Figure 19:
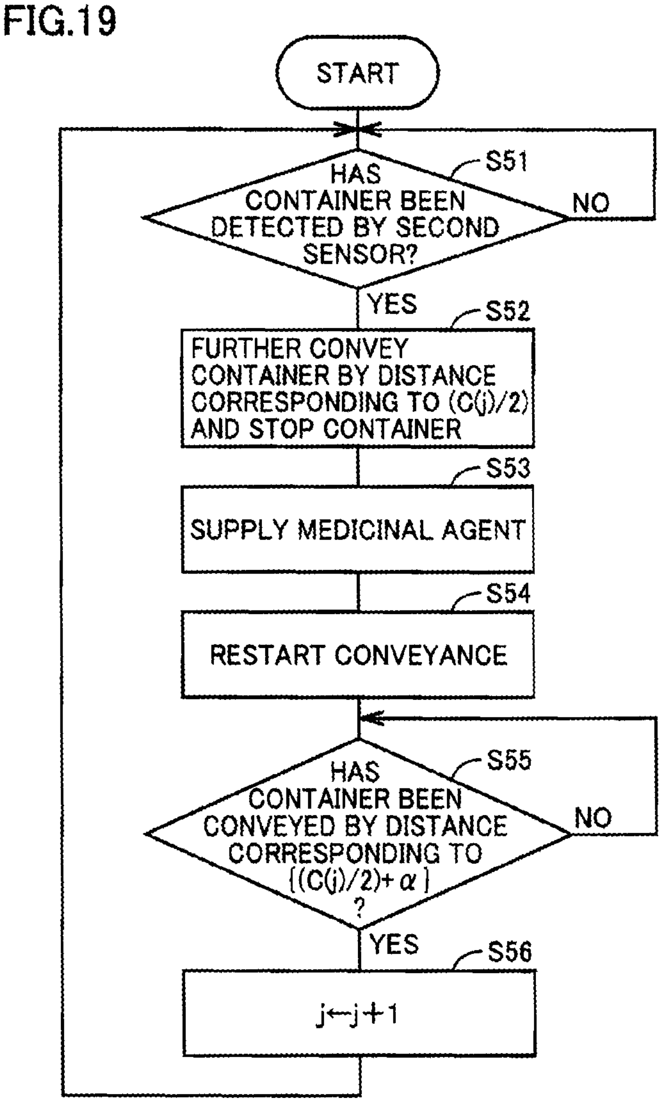
FIG. 19 is a flowchart showing each step of the operation for conveying the container to the supply position.

FIG. 19 is a flowchart showing each step of the operation for conveying container 26 to supply position L. FIG. 19 illustrates the operation for positioning and stopping container 26 at supply position L based on the measurement data obtained for each of the plurality of containers 26. Second sensor shown in FIG. 19 refers to central detecting unit 52 provided at supply position L.

As shown in FIG. 19, it is first determined in step (S51) whether container 26 has been detected at supply position L or not. While light receiving portion 52*b* is receiving the light generated by light emitting portion 52*a* of central detecting unit 52, the light generated by light emitting portion 52*a* is not blocked by container 26 and container 26 is not detected at supply position L. While control device 80 is receiving the detection result indicating that container 26 is not detected at supply position L from central detecting unit 52, control device 80 determines that container 26 is not present at supply position L. The determination in step (S51) is repeated until container 26 reaches supply position L and central detecting unit 52 detects container 26 at supply position L.

If container 26 is detected at the supply position, the process proceeds to step (S52). In step (S52), container 26 is further conveyed by a distance corresponding to one half of an incremented value of counter value C(j) for the j-th container 26, and thereafter, container 26 is stopped. "j" herein is an integer that is equal to or larger than 1. A value of j is allocated to each of the plurality of containers 26 conveyed by conveyance device 30, and is defined as j=1, 2, 3, . . . in order from container 26 at the head in conveyance direction DR1.

As a result, after central detecting unit 52 detects the first container 26, container 26 is conveyed by the distance corresponding to counter value C(1), i.e., the distance corresponding to one half of the outer diameter of the first container 26. As a result, the center of container 26 is aligned with supply position L and the first container 26 is arranged at supply position L where the medicinal agent can be supplied to container 26. When the first container 26 is arranged at supply position L, the process proceeds to step (S53) and the medicinal agent is supplied to container 26.

When the supply of the medicinal agent to the first container 26 is completed, the process proceeds to step (S54) and the conveyance of container 26 in conveyance direction DR1 is restarted. Next, in step (S55), it is determined whether or not container 26 has been conveyed by a distance corresponding to a sum of margin value α and one half of the incremented value of counter value C(j). The determination in step (S55) is continued until it is determined that container 26 has been conveyed by the distance corresponding to the sum of margin value α and one half of the incremented value of counter value C.

When the conveyance is restarted in step (S54), container 26 is present at supply position L, and while container 26 is being conveyed from supply position L by the distance corresponding to one half of the incremented value of counter value C(j), central detecting unit 52 detects container 26 that has already been supplied with medicinal agent M at supply position L. Therefore, by determining that container 26 has been conveyed by the distance corresponding to the sum of margin value α and the distance corresponding to one half of the incremented value of counter value C (i.e., distance corresponding to one half of the outer diameter of container 26), container 26 that has already been supplied with the medicinal agent reliably moves away from supply position L. If container 26 is subsequently detected at supply position L, this detected container 26 is a container that is not filled with the medicinal agent.

If it is determined in step (S55) that container 26 has been conveyed by the distance corresponding to the sum of margin value α and one half of the incremented value of counter value C, the process next proceeds to step (S56) and 1 is added to j. Thereafter, the process returns to step (S51) and it is again determined whether container 26 has been detected at supply position L or not. If the second container 26 is detected at supply position L, container 26 is conveyed by a distance corresponding to counter value C(2), i.e., a distance corresponding to one half of an outer diameter of the second container 26. As a result, the second container 26 is arranged at supply position L.

In this manner, the measurement data corresponding to the outer diameter of container 26 that is being conveyed on the upstream side with respect to supply position L is obtained for each of the plurality of containers 26 and container 26 is conveyed based on the obtained measurement data. Therefore, the plurality of containers 26 can be reliably stopped at supply position L.

By measuring the outer diameter of container 26 before container 26 reaches supply position L, and conveying the container by the distance corresponding to one half of the outer diameter after central detecting unit 52 detects container 26, container 26 can be arranged at supply position L. Therefore, it is unnecessary to reversely convey container 26 as described in the first embodiment, and the time required to arrange each container 26 at supply position L can be further shortened. Therefore, the time required to supply medicinal agent M to the plurality of containers 26 can be further shortened. On the other hand, the configuration in the second embodiment requires both container outer diameter detecting unit 42 and central detecting unit 52, and thus, the number of required sensors is larger than that in the first embodiment. Namely, medicinal agent filling device 1 according to the first embodiment is considered to be superior in simplification of the configuration and cost reduction of medicinal agent filling device 1.

Figure 20:
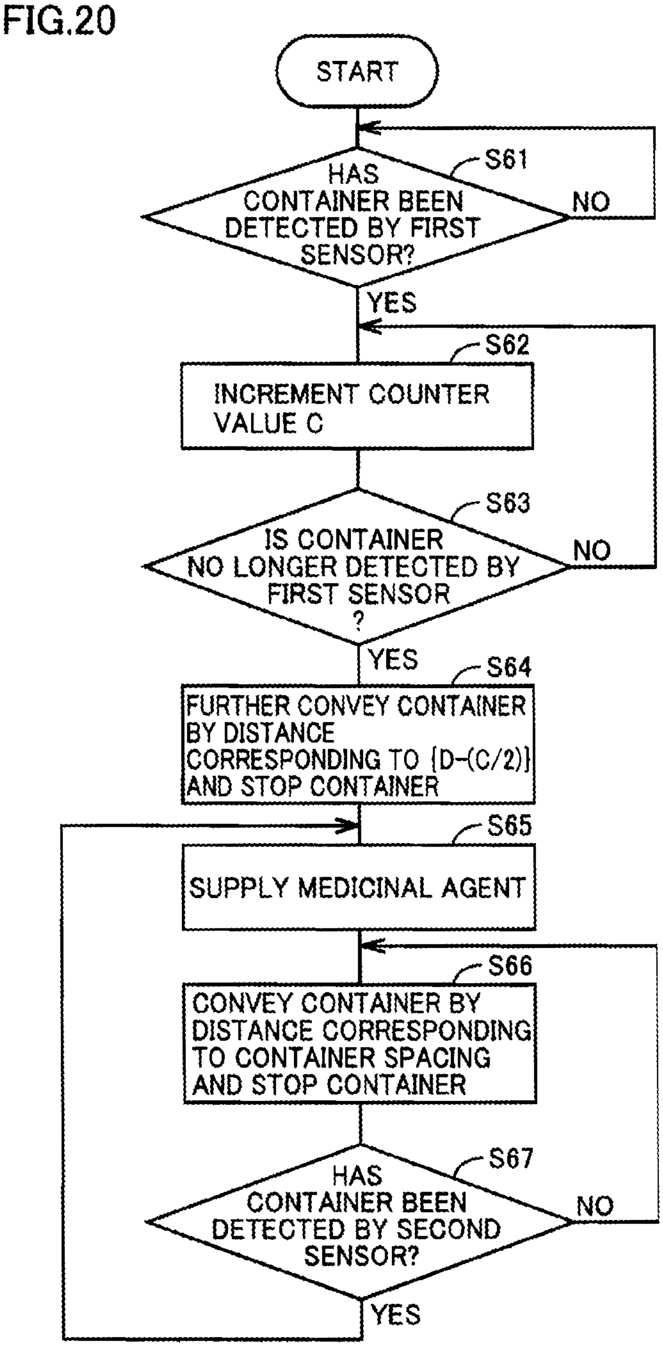
FIG. 20 is a flowchart showing each step of a modification of the operation for obtaining the measurement data corresponding to the outer diameter of the container by using the sensor arranged on more upstream side than the medicinal agent supply position.

FIG. 20 is a flowchart showing each step of a modification of the operation for obtaining the measurement data corresponding to the outer diameter of container 26 by using the sensor arranged on more upstream side than medicinal agent supply position L. In the modification shown in FIG. 20, the plurality of containers 26 conveyed by conveyance device 30 are arranged at regular spacings in conveyance direction DR1, and when the supply of the medicinal agent to container 26 is completed, container 26 is conveyed by a distance corresponding to the spacing between containers 26, and it is determined whether to detect the next container 26 or not. As described with reference to FIG. 15, the regular spacings mean that a distance in conveyance direction DR1 between the centers of containers 26 arranged in conveyance direction DR1 is fixed.

Similarly to FIGS. 18 and 19, first sensor shown in FIG. 20 refers to container outer diameter detecting unit 42 provided on more frontward side than supply position L, and second sensor refers to central detecting unit 52 provided at supply position L. Furthermore, a distance between container outer diameter detecting unit 42 and central detecting unit 52 in conveyance direction DR1 is defined as "D". This distance D is predetermined on the machine side. Alternatively, the operator may input a value of distance D into control device 80 through input unit 82 (refer to FIG. 6) in advance.

When the conveyance of container 26 is started, it is determined in step (S61) whether container 26 has been detected at the container outer diameter detection position or not, as shown in FIG. 20. The determination in step (S61) is repeated until container 26 reaches the container outer diameter detection position and container 26 is detected at the container outer diameter detection position.

If container 26 is detected at the container outer diameter detection position, the process proceeds to step (S62) and counter value C is incremented. Next, in step (S63), it is determined whether container 26 is no longer detected at the container outer diameter detection position or not. If container 26 is not no longer detected, i.e., while container 26 is being detected at the container outer diameter detection position, in the determination in step (S63), the process returns to step (S62) and the incrementing of the counter value is continued.

If it is determined in step (S63) that container 26 is no longer detected, the process proceeds to step (S64), and container 26 is further conveyed by a distance obtained by subtracting, from distance D, the distance corresponding to one half of the incremented value of counter value C, and thereafter, container 26 is stopped. As a result, after container outer diameter detecting unit 42 no longer detects container 26, container 26 is conveyed by the distance obtained by subtracting the distance corresponding to one half of the outer diameter of container 26 from distance D corresponding to the spacing between container outer diameter detecting unit 42 and central detecting unit 52. As a result, the center of container 26 is aligned with supply position L and container 26 is arranged at supply position L where the medicinal agent can be supplied to container 26. When container 26 is arranged at supply position L, the process proceeds to step (S65) and the medicinal agent is supplied to container 26.

When the supply of the medicinal agent is completed, conveyance device 30 next conveys container 26 by the distance corresponding to the spacing between containers 26 and stops container 26 in step (S66). The spacing between containers 26 can be input by the operator into control device 80 through input unit 82 (refer to FIG. 6). Next, determination in step (S67) is made, and if container 26 is not detected at the position where container 26 has been stopped in step (S66), the process returns to step (S66) and the conveyance of container 26 is repeated. If container 26 is detected at the position where container 26 has been stopped in step (S66), the process returns to step (S65) and the medicinal agent is supplied to detected container 26.

In the description of the first and second embodiments, the counter value is incremented during the period from the start to the end of detection of container 26 by container outer diameter detecting unit 42, and thereby, the measurement data corresponding to the outer diameter of container 26 is obtained. However, the present invention is not limited to this configuration. For example, a sensor such as a rotary encoder may be provided at a pulley that drives conveyance device 30, to detect the number of rotations of the pulley during a period from the start to the end of detection of container 26 by container outer diameter detecting unit 42, thereby converting the number of rotations to a distance in conveyance direction DR1. In the case where the measurement data corresponding to the outer diameter of container 26 is obtained based on the movement distance in conveyance direction DR1 by conveyance device 30 as described above, the measurement data corresponding to the outer diameter of container 26 can be obtained without the need to use the counter value.

In addition, each detecting unit sheds the light directly on container 26, and thereby, the measurement data corresponding to the outer diameter of container 26 is obtained. However, the present invention is not limited to this configuration. For example, a detected portion to be detected by the detecting unit may be provided on an outer perimeter surface of main body portion 21 of holding body 20 that holds container 26. This detected portion is formed, for example, by providing a strip-like portion different in color tone from main body portion 21. In this case, the detecting unit may be a reflective-type light sensor. In the case where the detected portion is formed to extend along conveyance direction DR1 by a length corresponding to the outer diameter of container 26, the measurement data corresponding to the outer diameter of container 26 can be similarly obtained based on the detection result during a period from the start to the end of detection of the detected portion by the detecting unit.

In addition, holding body 20 that holds container 26 has three holding sections 22 and holding body 20 can simultaneously hold a maximum of three containers 26. However, the present invention is not limited to this configuration. Holding body 20 may be able to have a larger number of holding sections 22 and simultaneously hold a larger number of containers 26 in accordance with the increase in the number of holding sections 22. A plurality of types of holding bodies 20 having the different number of holding sections 22 may be prepared and holding body 20 may be selectable as appropriate by the user operating medicinal agent filling device 1. Holding body 20 is not limited to such a configuration that holding body 20 holds containers 26 having the same shape. Holding body 20 may be provided to be capable of holding containers 26 having different outer diameters d in conveyance direction DR1.

Furthermore, holding body 20 may be provided to be capable of adjusting a dimension of holding section 22 in conveyance direction DR1. In this case, by appropriately adjusting the dimension of holding section 22, containers 26 having different outer diameters can be held by the same holding section 22. In the case where holding body 20 is provided with the detected portion, it is desirable to make the extending length of the detected portion variable in accordance with the dimension of holding section 22 and to appropriately adjust the detected portion to have a length corresponding to the outer diameter of container 26 in conveyance direction DR1.

Furthermore, holding body 20 that holds container 26 is not necessarily needed and container 26 may be directly placed on belt 32 of conveyance device 30. In this case, if positional displacement of container 26 occurs in the width direction of belt 32 orthogonal to conveyance direction DR1, hopper 12 of supply device 10 does not face upper opening 28 of container 26 and hopper 12 of supply device 10 is displaced from upper opening 28 of container 26 in the width direction when container 26 is arranged at the position corresponding to supply position L in conveyance direction DR1. Therefore, in order to suppress such displacement of container 26, it is desirable to provide a guide unit for guiding container 26 to the center in the width direction.

When a plurality of containers 26 are directly placed on belt 32, the plurality of containers 26 are sequentially placed on belt 32 so as to avoid overlap in conveyance direction DR1. With such a configuration, container outer diameter detecting unit 42 can detect container 26 accurately, and thus, the measurement data corresponding to the outer diameter of container 26 can be reliably detected and container 26 can be stopped at supply position L.

While the embodiments of the present invention have been described above, it should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST

1 medicinal agent filling device; 10 supply device; 18 supply motor; 20 holding body; 21 main body portion; 22, 22*a*, 22*b*, 22*c* holding section; 25 bottom plate; 26 container; 27 pillar; 30 conveyance device; 38 conveyance motor; 42 container outer diameter detecting unit; 52 central detecting unit; 54 upstream side detecting unit; 56 downstream side detecting unit; 80 control device; DR1 conveyance direction; DR2 reverse conveyance direction; L supply position; M medicinal agent.

The invention claimed is:

1. A medicinal agent filling device, comprising:

a supply device for supplying a medicinal agent of interest to a container capable of being filled with said medicinal agent;

a conveyance device for conveying said container; and a detecting unit for obtaining measurement data corresponding to an outer diameter of said container in a conveyance direction of said container by said conveyance device, wherein based on said measurement data, said conveyance device stops said container at a supply position where said medicinal agent can be supplied from said supply device to said container, wherein said detecting unit includes a sensor for detecting said container located at said supply position, and wherein when a state changes from a state in which said sensor detects said container to a state in which said sensor no longer detects said container, said conveyance device conveys said container in a reverse direction by a distance corresponding to one half of said outer diameter and stops said container.

2. The medicinal agent filling device according to claim 1, further comprising:

a holding body capable of holding the plurality of said containers with spacings in said conveyance direction.

3. The medicinal agent filling device according to claim 1, wherein said holding body is provided to be capable of holding said containers different in said outer diameter.

4. A medicinal agent filling device, comprising:

a supply device for supplying a medicinal agent of interest to a container capable of being filled with said medicinal agent;

a conveyance device for conveying said container; and a detecting unit for obtaining measurement data corresponding to an outer diameter of said container in a conveyance direction of said container by said conveyance device, wherein based on said measurement data, said conveyance device stops said container at a supply position where said medicinal agent can be supplied from said supply device to said container, wherein said detecting unit includes a sensor for detecting said container located at said supply position, wherein said conveyance device simultaneously conveys a plurality of said containers spaced apart from one another in said conveyance direction, wherein said detecting unit obtains said measurement data of said container that first reaches said supply position, and wherein when said sensor detects second and subsequent ones of said containers, said conveyance device conveys said container by a distance corresponding to one half of said outer diameter and stops said container.

5. The medicinal agent filling device according to claim 4, further comprising:

a holding body capable of holding the plurality of said containers with spacings in said conveyance direction.

6. The medicinal agent filling device according to claim 4, wherein said holding body is provided to be capable of holding said containers different in said outer diameter.

7. A medicinal agent filling device, comprising:

a supply device for supplying a medicinal agent of interest to a container capable of being filled with said medicinal agent;

a conveyance device for conveying said container;

a detecting unit for obtaining measurement data corresponding to an outer diameter of said container in a conveyance direction of said container by said conveyance device, wherein based on said measurement data, said conveyance device stops said container at a supply position where said medicinal agent can be supplied from said supply device to said container, wherein said detecting unit includes a sensor for detecting said container located on more upstream side than said supply position; and the medicinal agent filling device further comprises a second sensor for detecting said container located at said supply position, wherein when said second sensor detects said container, said conveyance device conveys said container by a distance corresponding to one half of said outer diameter and stops said container.

8. The medicinal agent filling device according to claim 7, further comprising:

a holding body capable of holding the plurality of said containers with spacings in said conveyance direction.

9. The medicinal agent filling device according to claim 7, wherein said holding body is provided to be capable of holding said containers different in said outer diameter.

* * * * *